US010805383B2

(12) United States Patent
Schincariol et al.

(10) Patent No.: US 10,805,383 B2
(45) Date of Patent: *Oct. 13, 2020

(54) ACCESS MANAGEMENT IN A DATA STORAGE SYSTEM

(71) Applicant: Oracle International Corporation, Redwood Shores, CA (US)

(72) Inventors: Merrick Schincariol, Ottawa (CA); Naresh Revanuru, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,669

(22) Filed: Mar. 5, 2019

(65) Prior Publication Data

US 2019/0199782 A1 Jun. 27, 2019

Related U.S. Application Data

(63) Continuation of application No. 14/622,648, filed on Feb. 13, 2015, now Pat. No. 10,225,325.

(Continued)

(51) Int. Cl.
*G06F 7/04* (2006.01)
*H04N 7/16* (2011.01)
(Continued)

(52) U.S. Cl.
CPC ............ *H04L 67/10* (2013.01); *G06F 9/5072* (2013.01); *G06F 21/335* (2013.01); *H04L 41/0806* (2013.01); *H04L 67/1097* (2013.01)

(58) Field of Classification Search
CPC . H04L 67/10; H04L 41/0806; H04L 67/1097; G06F 9/5072; G06F 21/335
See application file for complete search history.

(56) References Cited

U.S. PATENT DOCUMENTS 7,010,600 B1 * 3/2006 Prasad ................ H04L 63/0815
709/223
7,434,252 B2 * 10/2008 Ballinger .............. G06F 21/335
713/172

(Continued)

OTHER PUBLICATIONS

U.S. Appl. No. 14/622,638, Advisory Action dated Nov. 29, 2018, 4 pages.

(Continued)

*Primary Examiner* — John B King
*Assistant Examiner* — Darshan I Dhruv
(74) *Attorney, Agent, or Firm* — Kilpatrick Townsend & Stockton LLP

(57) ABSTRACT

A method and system for managing access to information stored in a data storage system of an organization is provided. In an embodiment, the data storage system may be configured to receive a request from a requester on a client device to access information stored in the data storage system. In some aspects, upon receiving the request, the first system may determine that an access token identifying the requester is stored in a cache in the data storage system. In some aspects, the data storage system may then retrieve one or more roles from the cache. In some examples, the roles may be associated with the access token. In certain embodiments, the data storage system may then be configured to determine that the requester is authorized to access the information based on the roles and provide the information to the requester on the client device.

20 Claims, 8 Drawing Sheets

Related U.S. Application Data

(60) Provisional application No. 61/939,657, filed on Feb. 13, 2014.

(51) Int. Cl.
  *H04L 29/08* (2006.01)
  *G06F 9/50* (2006.01)
  *G06F 21/33* (2013.01)
  *H04L 12/24* (2006.01)

(56) References Cited

U.S. PATENT DOCUMENTS

| | | | |
|---|---|---|---|
| 7,577,729 B1 | 8/2009 | Umbehocker et al. | |
| 8,261,037 B2 | 9/2012 | Scheuren | |
| 8,302,201 B1* | 10/2012 | Gupta | H04L 63/101 711/100 |
| 8,352,608 B1 | 1/2013 | Keagy et al. | |
| 8,402,514 B1* | 3/2013 | Thompson | H04L 63/08 726/4 |
| 8,745,718 B1* | 6/2014 | Dufel | H04L 63/0807 726/9 |
| 8,775,810 B1* | 7/2014 | Snodgrass | H04L 9/08 713/175 |
| 9,027,091 B2* | 5/2015 | Mardikar | H04L 63/20 726/4 |
| 9,154,568 B2* | 10/2015 | Alison | H04W 4/21 |
| 9,407,615 B2* | 8/2016 | Shah | H04L 63/08 |
| 9,721,117 B2 | 8/2017 | Pleau et al. | |
| 10,083,317 B2 | 9/2018 | Pleau et al. | |
| 10,225,325 B2 | 3/2019 | Schincariol et al. | |
| 10,372,936 B2 | 8/2019 | Pleau et al. | |
| 2002/0095571 A1* | 7/2002 | Bradee | G06F 21/6236 713/164 |
| 2002/0095581 A1 | 7/2002 | Imai et al. | |
| 2003/0005308 A1* | 1/2003 | Rathbun | H04L 63/168 713/185 |
| 2005/0013310 A1 | 1/2005 | Banker et al. | |
| 2005/0138362 A1* | 6/2005 | Kelly | H04L 63/0807 713/156 |
| 2006/0015933 A1 | 1/2006 | Ballinger et al. | |
| 2006/0037016 A1 | 2/2006 | Saha et al. | |
| 2006/0224687 A1 | 10/2006 | Popkin et al. | |
| 2007/0150934 A1 | 6/2007 | Fiszman et al. | |
| 2007/0245414 A1* | 10/2007 | Chan | H04L 9/3234 726/12 |
| 2008/0287136 A1 | 11/2008 | Ludwig et al. | |
| 2009/0070092 A1 | 3/2009 | Dickens et al. | |
| 2009/0094684 A1* | 4/2009 | Chinnusamy | H04L 63/0281 726/4 |
| 2009/0276824 A1* | 11/2009 | Rafiq | G06F 21/604 726/1 |
| 2009/0313684 A1* | 12/2009 | Shah | G06F 21/335 726/7 |
| 2010/0114826 A1 | 5/2010 | Voutilainen et al. | |
| 2011/0022812 A1 | 1/2011 | Van Der Linden et al. | |
| 2011/0238737 A1 | 9/2011 | Agrawal et al. | |
| 2012/0084869 A1* | 4/2012 | Bilaney | G06F 21/335 726/27 |
| 2012/0096526 A1* | 4/2012 | Brahmanapalli | H04N 21/47202 726/6 |
| 2012/0117229 A1 | 5/2012 | Van Biljon et al. | |
| 2012/0117586 A1* | 5/2012 | McCoy | H04N 21/4722 725/25 |
| 2012/0233668 A1 | 9/2012 | Leafe et al. | |
| 2012/0246695 A1* | 9/2012 | Cameron | G06F 21/6218 726/1 |
| 2012/0266156 A1 | 10/2012 | Spivak et al. | |
| 2012/0266168 A1 | 10/2012 | Spivak et al. | |
| 2012/0311111 A1 | 12/2012 | Frew et al. | |
| 2012/0330898 A1 | 12/2012 | BK et al. | |
| 2013/0007891 A1* | 1/2013 | Mogaki | H04L 63/104 726/27 |
| 2013/0232498 A1 | 9/2013 | Mangtani et al. | |
| 2013/0283350 A1 | 10/2013 | Afek et al. | |
| 2013/0318242 A1 | 11/2013 | Srinivasa | |
| 2014/0047434 A1 | 2/2014 | Lam et al. | |
| 2014/0215595 A1* | 7/2014 | Prasad | G06F 21/41 726/8 |
| 2014/0280805 A1 | 9/2014 | Sawalha | |
| 2014/0298323 A1 | 10/2014 | Stolberg et al. | |
| 2014/0337493 A1 | 11/2014 | Tung | |
| 2014/0365541 A1* | 12/2014 | Darcy | G06F 16/182 707/827 |
| 2014/0373126 A1 | 12/2014 | Hussain et al. | |
| 2015/0180868 A1* | 6/2015 | Sng | G06F 12/121 726/9 |
| 2019/0026486 A1 | 1/2019 | Pleau et al. | |

OTHER PUBLICATIONS

U.S. Appl. No. 14/622,638, Final Office Action dated Aug. 10, 2018, 20 pages.
U.S. Appl. No. 14/622,638, Final Office Action dated Jun. 5, 2017, 28 pages.
U.S. Appl. No. 14/622,638, Non-Final Office Action dated Nov. 4, 2016, 17 pages.
U.S. Appl. No. 14/622,638, Non-Final Office Action dated Oct. 30, 2017, 31 pages.
U.S. Appl. No. 14/622,648, Final Office Action dated Apr. 20, 2017, 27 pages.
U.S. Appl. No. 14/622,648, Final Office Action dated Jun. 14, 2018, 41 pages.
U.S. Appl. No. 14/622,648, Non-Final Office Action dated Sep. 13, 2016, 17 pages.
U.S. Appl. No. 14/622,648, Non-Final Office Action dated Nov. 2, 2017, 36 pages.
U.S. Appl. No. 14/622,648, Notice of Allowance dated Oct. 19, 2018, 32 pages.
U.S. Appl. No. 14/853,747, Non-Final Office Action dated Dec. 16, 2016, 6 pages.
U.S. Appl. No. 14/853,747, Notice of Allowance dated Mar. 28, 2017, 9 pages.
U.S. Appl. No. 15/661,641, Non-Final Office Action dated Dec. 28, 2017, 13 pages.
U.S. Appl. No. 15/661,641, Notice of Allowance dated May 9, 2018, 8 pages.
U.S. Appl. No. 16/140,299, Non-Final Office Action dated Nov. 27, 2018, 7 pages.
U.S. Appl. No. 16/140,299, Notice of Allowance dated Mar. 21, 2019, 5 pages.
U.S. Appl. No. 14/622,638, Notice of Allowance dated Jun. 28, 2019, 8 pages.

\* cited by examiner

ACCESS MANAGEMENT IN A DATA STORAGE SYSTEM

CROSS-REFERENCE TO RELATED APPLICATION

The present application is continuation of U.S. patent application Ser. No. 14/622,648, filed on Feb. 13, 2015, entitled "ACCESS MANAGEMENT IN A DATA STORAGE SYSTEM," which is a non-provisional application of and claims the benefit and priority under 35 U.S.C. 119(e) of U.S. Provisional Application No. 61/939,657, filed Feb. 13, 2014, entitled "CLOUD STORAGE SERVICES," the entire contents of which are incorporated herein by reference for all purposes

BACKGROUND OF THE INVENTION

The present disclosure relates generally to computer systems and software, and more particularly to techniques for managing access to information in an enterprise environment.

Data storage, both from an enterprise and from a consumer perspective, has progressed from locally stored storage systems for each computer system, to network attached storage which serves as centralized storage for a number of networked computer systems. These systems are typically owned and maintained by the end user, resulting in significant costs and complexity for end users to manage. In response, cloud-based storage services provide secure, elastic, reliable, and cost-effective storage solutions. With cloud-based storage services, the end user need only enroll in the service and the service provider manages the hardware and configuration, data security and integrity, etc. This enables users to change the amount of storage available cheaply and easily, by signing up for a different level of service. Once enrolled, authorized users and/or applications can access the data from any Internet-connected device.

In the context of enterprise systems, a user identity generally refers to information that uniquely identifies a user. By providing some of such information, a user may be permitted to access various resources available within the enterprise. These resources can include, for example, software products, applications (e.g., cloud-based applications, enterprise applications, or any other applications), cloud services, various types of data (e.g., networked files, directory information, databases, or the like) and other resources. In order to effectively manage user access to resources within an enterprise, the enterprise often has to keep track of identity information stored in multiple systems of the enterprise. As such, finding improved ways to manage user identities and access to available resources within an enterprise continues to be a priority.

BRIEF SUMMARY OF THE INVENTION

In certain embodiments, techniques are provided (e.g., a method, a system, non-transitory computer-readable medium storing code or instructions executable by one or more processors) for managing access to information stored in a data storage system of an organization. In accordance with at least some embodiments, a first system and a second system are disclosed. In some examples, the first system may correspond to a data storage system in the organization and the second system may correspond to an Identity Management (IDM) system in the organization. In some embodiments, the data storage system may be configured to manage, represent and store data related to the organization. In certain embodiments, the IDM system may be responsible for authenticating users to the data storage system and also managing user access to information stored in the data storage system.

In an embodiment, the first system may be configured to receive a request from a requester (e.g., a user) on a client device to access information stored in the data storage system. In some embodiments, upon receiving the request, the first system may determine that an access token is stored in a cache in the first system. In some examples, the access token may provide an indication to the first system that the requester is authenticated with the first system. In some examples, the first system may then retrieve one or more roles stored in the cache. In some examples, the one or more roles may be associated with the access token. In certain embodiments, the first system may then be configured to determine that the requester is authorized to access the information based on the one or more roles and provide the information to the requester on the client device.

In some embodiments, the first system may be configured to identify credential information (e.g., a username and password) identifying the requester from the request and provide the credential information to the second system (e.g., the IDM system). In certain embodiments, the first system may then be configured to receive the access token from the second system and store the access token in the cache. In some examples, the first system may then be configured to provide the access token to the requester. In some embodiments, the first system may be configured to receive one or more roles associated with the access token from the second system and store the one or more roles in the cache. In some embodiments, the roles may specify an access policy that enables the requester access to information stored in the first system. In some embodiments, the first system may be configured to determine that the requester is authorized to access the information by comparing an access control list associated with the information with the one or more roles associated with the access token.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Figure 1:
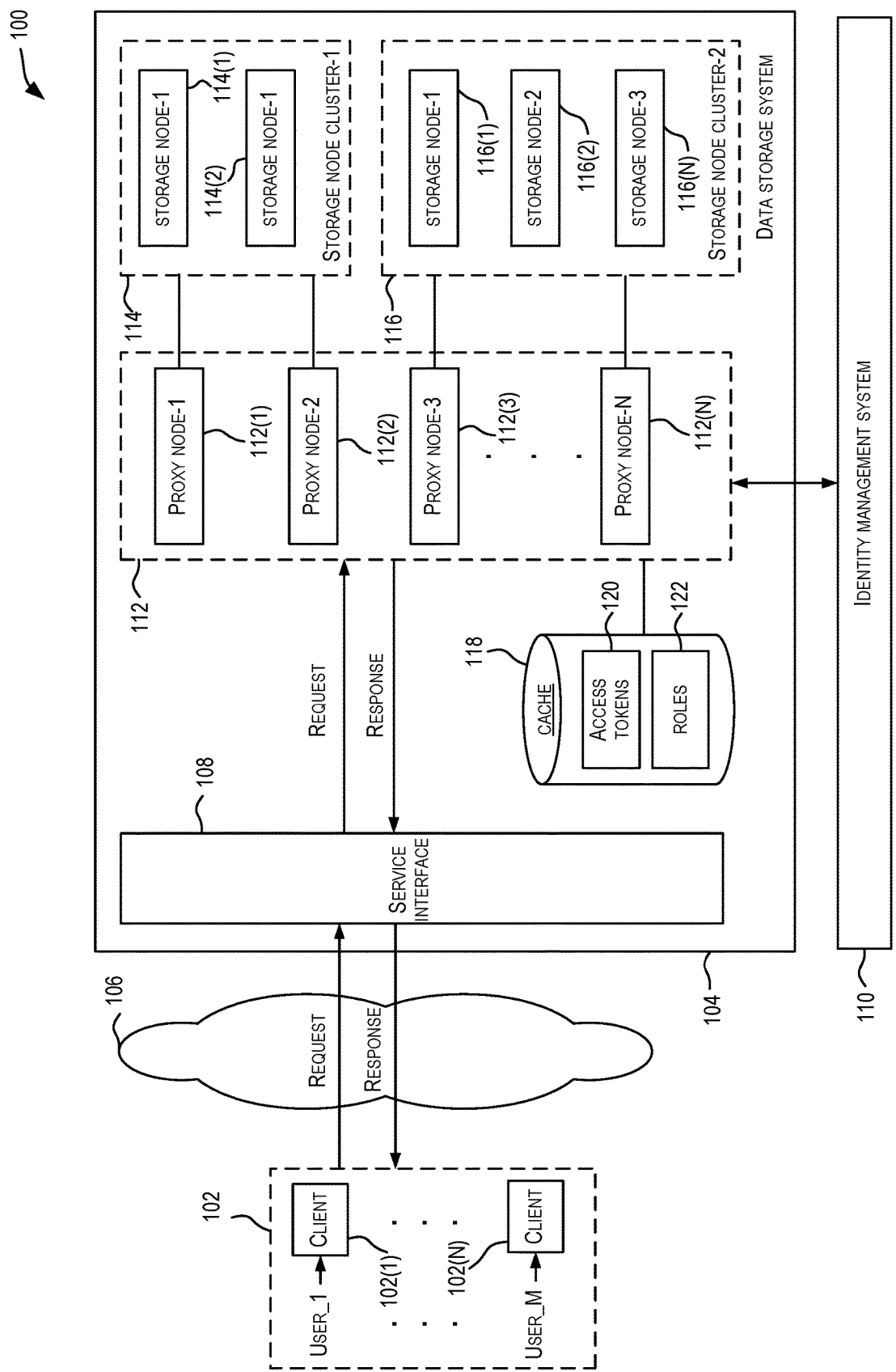
FIG. 1 depicts a simplified high level diagram of a network environment 100 that may incorporate an embodiment of the present invention.

FIG. 1 depicts a simplified high level diagram of a network environment 100 that may incorporate an embodiment of the present invention. As shown, network environment 100 may include one or more client devices 102(1)-102(N) (collectively, client devices 102) communicatively coupled to a data storage system 104 via a communication network 106. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

The client devices may be of various different types, including, but not limited to personal computers, desktops, mobile or handheld devices such as a laptop, a mobile phone, a tablet, etc., and other types of devices. Communication network 106 facilitates communications between client devices 102 and data storage system 104. Communication network 106 can be of various types and can include one or more communication networks. Examples of communication network 106 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth, and other protocols. In general, communication network 106 may include any communication network or infrastructure that facilitates communications between clients and data storage system 104.

In some embodiments, data storage system 104 may include a service interface 108 that may be configured to receive and manage requests from client devices 102. Service interface 108 can be a web interface, load balancer, or may implement one or more Representational State Transfer (REST) interfaces or any other interface, that mediates requests and responses between client devices 102 and data storage system 104. For instance, service interface 108 may be configured to receive Hyper Text Transfer Protocol (HTTP) requests formatted as REST requests from client devices 102 via a REST Application Programming Interface (API).

In some embodiments, data storage system 102 may be configured to manage, represent and store data related to an organization. In an embodiment, data storage system 102 may include one or more proxy nodes 112(1), 112(2), 112(3) . . . 112(n) (collectively, proxy nodes 112). In some examples, proxy nodes 112 may be implemented as proxy servers configured to receive requests from client devices 102 via service interface 108. For example, proxy nodes 112 may be configured to receive requests for data to be stored in data storage system 102 via service interface 108 from client devices 102. In certain embodiments, proxy nodes 112 may be associated with a plurality of storage node clusters 114, 116. In an embodiment, storage node clusters 114, 116 may include one or more storage nodes. For instance, and as shown in FIG. 1, storage node cluster 114 may include storage nodes 114(1) and 114(2) and storage node cluster 116 may include storage nodes 116(1), 116(2) and 116(3). In some embodiments, in response to receiving a request from client devices 102, data storage system 102 may initiate, in parallel, the storage of the data on one or more storage node clusters (114, 116). Data storage system 104 may then be configured to store the data on the storage node clusters (114, 116) and respond to client devices 102 that the data has been stored.

In certain embodiments, proxy nodes 112 may be configured to receive requests from client devices 102 to access information and/or data or objects stored in data storage system 104. This information may include for example, networked files (such as text files, images, videos or the like), directory information, databases, or the like. Data storage system 104 may then be configured to provide the data to the client devices in response to the request.

The various proxy nodes, storage node clusters and storage nodes of data storage system 104 depicted in FIG. 1 are meant for illustrative purposes only and are not intended to limit the scope of embodiments of the present invention. Alternative embodiments may include more or fewer proxy nodes, storage node clusters and storage nodes than those shown in FIG. 1. Similarly, the connection of proxy nodes 112(1) and 112(2) to storage node cluster-1 and proxy nodes 112(3) and 112(N) to storage node cluster-2 in FIG. 1 are meant for illustrative purposes only. In alternate embodiments, proxy nodes 112(1) . . . 112(N) may be connected to either or both storage node clusters 114 and 116.

In certain embodiments, the storage nodes within storage node clusters 114, 116 may be implemented as separate physical nodes. In other embodiments, the storage nodes may each be virtual nodes executing on a single physical node (e.g., the storage nodes may be software nodes implemented on one or more virtual machines executing on a single hardware computing device). In an embodiment, the storage nodes may be configured to store the information that incoming requests from users of client devices 102 wish to access.

In some embodiments, data storage system 104 can include a configuration and installation framework. During set up, a user, such as an administrator, can interface with the configuration and installation framework through an administrative console. The configuration and installation framework can automatically set up, or update, the nodes in data storage system 104 using configuration information in a configuration file (e.g., a configuration script). A configuration file can be received as input to the configuration and installation framework from the administrative console. The configuration file can define multiple types of nodes in a cluster. For example, types of nodes can include storage nodes (e.g., nodes that include computer readable storage media for storing data), proxy nodes (e.g., nodes that handle requests for data stored on storage nodes), and master/admin proxy nodes (e.g., nodes that manage cluster configuration and account configuration data). Additionally, in some embodiments, the configuration and installation framework can be used to update the nodes in the data storage system 104 using an updated configuration file.

In some embodiments, proxy nodes 112 may be configured to determine if a request from client devices 102 includes an access token that identifies a user with data storage system 104. In some embodiments, the access token may be generated by identity management (IDM) system 110 and provided to data storage system 104. The manner in which IDM system 110 may generate access tokens is discussed in detail in relation to FIG. 2. In some embodiments, upon determining that the request includes an access token, proxy nodes 112 may be configured to search cache 118 of data storage system 104 to determine if the access token is stored in the cache. In some embodiments, cache 118 may be a caching server in data storage system 104 configured to store access tokens associated with users and user information (e.g., roles and/or access policies) associated with the users in temporary storage. By caching the access token and user information, the number of calls to IDM system 110 may be reduced, improving the processing of requests by the system.

If an access token related to the request is stored in cache 118, in some examples, proxy nodes 112 may then be configured to determine the validity of the access token. For instance, the access token may be active for a finite duration (e.g., 30 seconds) after which it may need to be re-generated. In certain embodiments, after checking the validity of the access token, proxy nodes 112 may be configured to retrieve one or more roles 122 associated with the access token 120 from cache 118. Proxy nodes 112 may then be configured to determine the appropriate storage node that has the requested information. In certain embodiments, proxy nodes 112 may then be configured to determine that the user is authorized to access the information based on the one or more roles associated with the access token and an access control list (ACL) associated with the requested information (object) in the storage node. In some embodiments, upon determining that the user is authorized to access the information, proxy nodes 112 may be configured to provide the information to the user on client device 102. For example, proxy nodes 112 may be configured to provide a response that includes the information and/or data to the client device via service interface 108. Additional details of the manner in which information in a data storage system is managed and accessed is discussed in detail in relation to FIG. 2.

By storing information (e.g., user roles and/or access policies) associated with users in a cache in data storage system 104 and associating the information with access tokens that identify the users, proxy nodes 112 do not need to request IDM system 110 for this information each time a request is received from the user. Accordingly, the storage of access tokens and user roles and/or access policies associated with the access tokens in a cache in data storage system 104 minimizes network delays for end-users requesting for information from the data storage system and improves overall network performance.

In certain embodiments, IDM system 110 may be responsible for authenticating users to data storage system 104 and also managing user access to information stored in data storage system 104. IDM system 110 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up identity management system 110 may include a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like. Additional details of the manner in which requests for information may be received and managed by data storage system 104 and IDM system 110 is discussed in detail in relation to FIG. 2.

Figure 2:
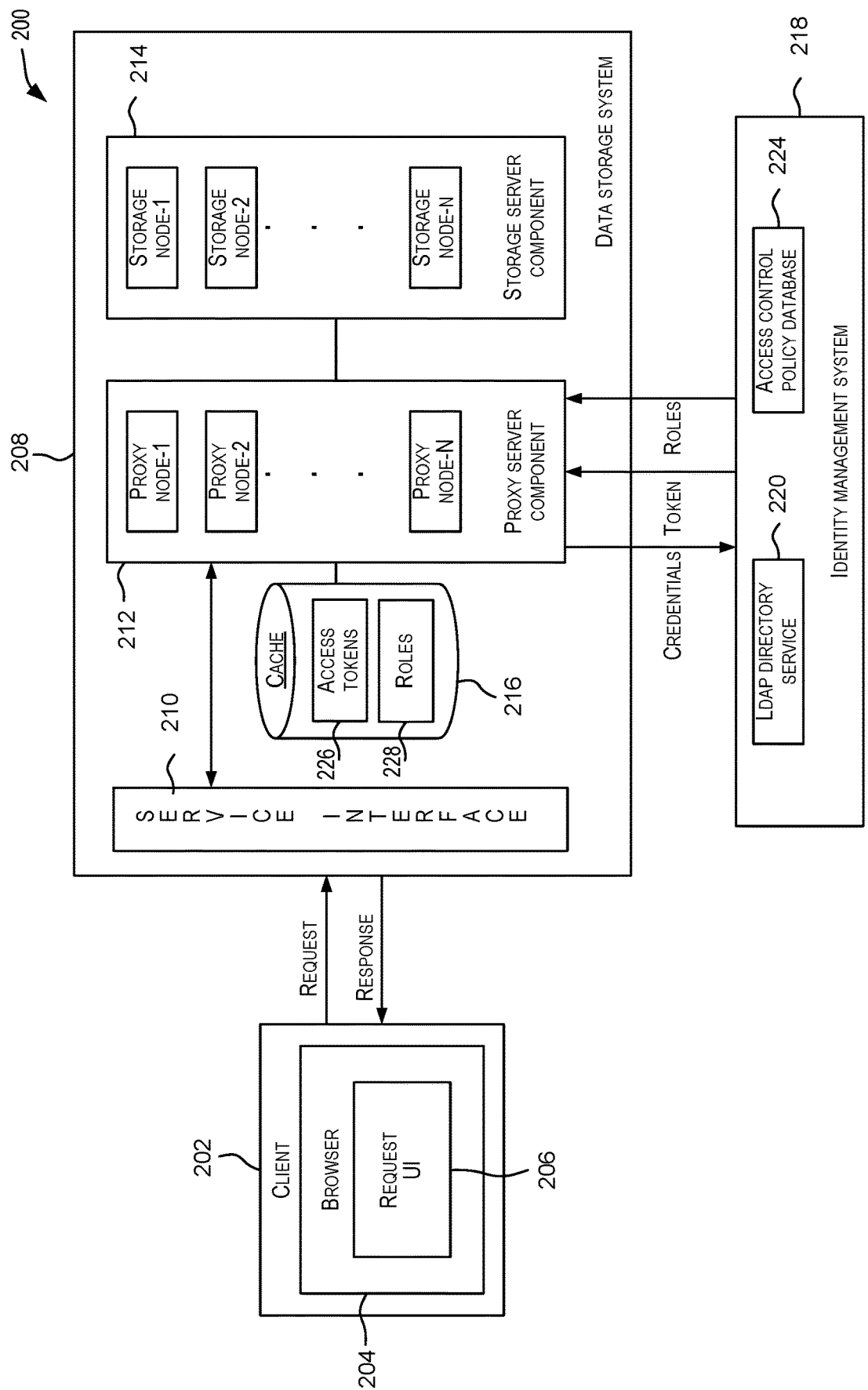
FIG. 2 depicts a simplified high-level diagram of an environment 200 comprising a data storage system according to another embodiment of the present invention.

FIG. 2 depicts a simplified high-level diagram of an environment 200 comprising a data storage system according to another embodiment of the present invention. The data storage system may be the same or similar to data storage system 104 described in FIG. 1. In the embodiment depicted in FIG. 2, data storage system 208 may include a proxy server component 212 that comprises one or more proxy nodes and a storage server component 214 that comprises one or more storage nodes. As noted above, the proxy nodes and storage nodes may be implemented as general purpose computers, specialized server computers, server farms, server clusters, or any other appropriate arrangement and/or combination. The various components of data storage system depicted in FIG. 2 are meant for illustrative purposes only and are not intended to limit the scope of embodiments of the present invention. Alternative embodiments may include more or fewer components than those shown in FIG. 2.

In accordance with at least some embodiments, a requester (e.g., a user) operating a client device such as client device 202 may utilize an application on client device 202 to request for information stored in data storage system 208. For example, the requester may access a user interface, such as request user interface (UI) 206 via a browser application 204 on client device 202 to request for information. Client device 202 may be the same or similar as client devices 102 discussed in relation to FIG. 1. In some examples, the request may include a HTTP request that may include credential information (e.g., username and password) identifying the requester. In some examples, the request may also include a URL that specifies a location of the requested information in the data storage system. For instance, the URL may specify a location of an object in data storage system 208 where the information is stored. In an embodiment, one of the proxy nodes in proxy server component 212 may be configured to receive the request via service interface 210 and transmit the request to identity management (IDM) system 218. Service interface 210 may be the same as or similar to service interface 108 described in FIG. 1. Similarly, IDM system 218 may be the same or similar to IDM system 110 described in FIG. 1.

In certain embodiments, IDM system 218 may be configured to confirm the identity of the user by verifying the credential information provided in the request against an LDAP directory service 220. In some examples, LDAP directory service 220 may act as a central repository of user information for applications utilized by client device 202 to access information stored in data storage system 208. In an embodiment, LDAP directory service 220 may be a software application, or a set of applications that stores, among other information, identity management information necessary to authenticate requesters (e.g., users) to data storage system 208. Identity management information may include user identity information, user security information and account state information. User identity information may include, for example, a user name and/or an email address associated with the user. User security information may include, for example, a password, secure token, fingerprint information and the like associated with the user. In some embodiments, the user identity information may be stored as entries within LDAP directory service 220 which may be accessed by data storage system 208 according to a predefined protocol. In some embodiments, LDAP directory service 220 may be accessed in accordance with and implemented using a protocol such as LDAP (lightweight directory access protocol).

In some embodiments, IDM system 218 may include an access control policy database 224. In some examples, access control policy database 224 may define one or more roles that specify a set of privileges and/or access rights that users of a specific role within the organization have access to. For instance, access control policy database may define a 'sales manager' role for a user that enables the user to view sales statistics and employee information stored in a particular storage node of data storage system 104 but not enable the user to modify the information. In some embodiments, access control policy database 224 may also include account state information associated with users of the organization. Account state information may include for example, the number and type of accounts provisioned to users of the organization. Account state information may also include information such as the number of failed authentication attempts for a particular user, the time between failed authentication attempts and other information necessary to implement access control policies in LDAP directory service 220.

As noted above, in some embodiments, IDM system 218 may be configured to receive user identity information (e.g., credentials such as a username and password) from proxy server component 212. In some instances, upon receiving the user identity information, IDM system 218 may be configured to search for the user by passing the user identity information to LDAP directory service by an operation defined in the protocol used to interact with the LDAP directory service. For example, in LDAP directory service 220, a search operation may be performed by an LDAP search operation. LDAP directory service 220 may then search the entries stored within its directory structure to determine if an entry matches the user identity information. If no match is found, the authentication request fails and IDM system 218 reports backs to data storage system 208 that the identity information submitted by the user is not recognized by the IDM system.

If a match for the user identity information is found in LDAP directory service 220, in some embodiments, LDAP directory service 220 may generate an access token for the user, which the user may utilize to make subsequent requests for information stored in data storage system. In some examples, the access token may be a hash value (one-way function) of the user's security information. Thus, if the security information is the user's password, the access token may be a number generated by running the password through a one-way hash function. In other examples, the access token may be a 128-bit random number that is generated by LDAP directory service 220. In some embodiments, when a match for the user identity information is found in LDAP directory service 220, IDM system 218 may be configured to transmit an 'authentication successful' message to the proxy server component. Proxy server component 212 may then be configured to generate the access token for the user. In some embodiments, the authentication successful message to the proxy server component may include token information (e.g., expiry time, user identity information, verification and/or validation data, etc.) which may be used by the proxy server component when generating the access token.

As described above, when a proxy server receives a request from a user, the proxy server can determine whether a token is associated with the user. Previous systems merely determined whether a token was present, without validating the token or performing any additional checks on the token. To address this issue, in some embodiments, the data storage system 208 may maintain a private symmetrical encryption key. When a proxy server component generates an access token, the access token may be encrypted using the private symmetrical encryption key prior to returning the access token to the client device 202. The encrypted token may include token information (e.g., expiry time, user identity information, verification and/or validation data, etc.). In some embodiments, the validation data can include non-identifying information included by the proxy server component to be used to validate the access token during subsequent requests. When the access token is provided subsequently as part of a request, the access token may be decrypted by the proxy server component and the validation data can be checked to ensure the integrity of the token This provides secure end-to-end token processing by proxy server components to validate tokens, in addition to existence checks.

In some embodiments, IDM system 218 may be configured to manage token encryption. The IDM system may generate an encryption key pair for the access token. The encryption key pair may include an encryption key for encrypting the token and a decryption key for validating the token. In some examples, IDM system 218 may be configured to use the encryption key to encrypt a hash value of the user's security information to create a digital signature. IDM system 218 may then be configured to transmit the encrypted token along with the digital signature to proxy server component 212. In some embodiments, proxy server component 212 may be configured to decrypt the token by extracting the decryption key and decrypting the digital signature. Upon successful verification of the digital signature, proxy server component 212 may be configured to authorize the user's access information stored in the proxy server component 212.

In some embodiments, IDM system 218 may be configured to identify one or more roles associated with the access token. In some embodiments, the roles may specify a set of privileges and/or access rights that users of a specific role within the organization have access to. For example, an access token for a user may be associated with a 'Sales Manager' role and a 'Human Resources Manager' role. The 'Sales Manager' role may enable the user to view sales information and reports associated the organization but not enable the user modify the information. The 'Human Resources Manager' role may enable a user to view and modify employee information within the organization.

In some embodiments, IDM system 218 may then be configured to transmit the access token and the one or more roles associated with the access token to data storage system 208. In some embodiments, IDM system 218 may also be configured to transmit information associated with the access token such as the expiry time associated with the access token. In certain embodiments, one or more proxy nodes in proxy server component 212 in data storage system 208 may be configured to receive the access token and the one or more roles associated with the access token from IDM system 218. Proxy server component 212 may then be configured to store the access token 226 and the one or more roles 228 associated with the access token in cache 216 in data storage system 208. By caching the access token and user information, the number of calls to IDM system 110 and/or LDAP directory service 220 may be reduced, improving the processing of requests by the system. In some embodiments, proxy server component 212 may then be configured to determine the appropriate storage node in data storage system 208 that has the requested information and retrieve the access control list for the requested information (object). As described herein, an access control list may include a list of permissions attached to the object that specifies which users are granted access to the object as well as the operations that the users may perform on the object. For instance, an access control list for a 'file' object stored in data storage system may enable a first user to read and write to the file but enable a second user to only read the file.

In certain embodiments, proxy server component 212 may then be configured to determine whether the user is authorized to access the object by comparing the one or more roles associated with the access token to the access control list associated with the object. For instance, proxy server component 212 may determine that the user is authorized to access an object (e.g., an employee file) stored in data storage system 208 if, for example, the access token associated with the user is associated with a 'Human Resource Manager' role, and the access control list of the object (e.g., an employee file) enables the user to read and write to the file. In some embodiments, upon determining that the user is authorized to access the object, proxy server component 212 may then be configured to provide the information to the user on client device 202 via service interface 210.

Figure 3:
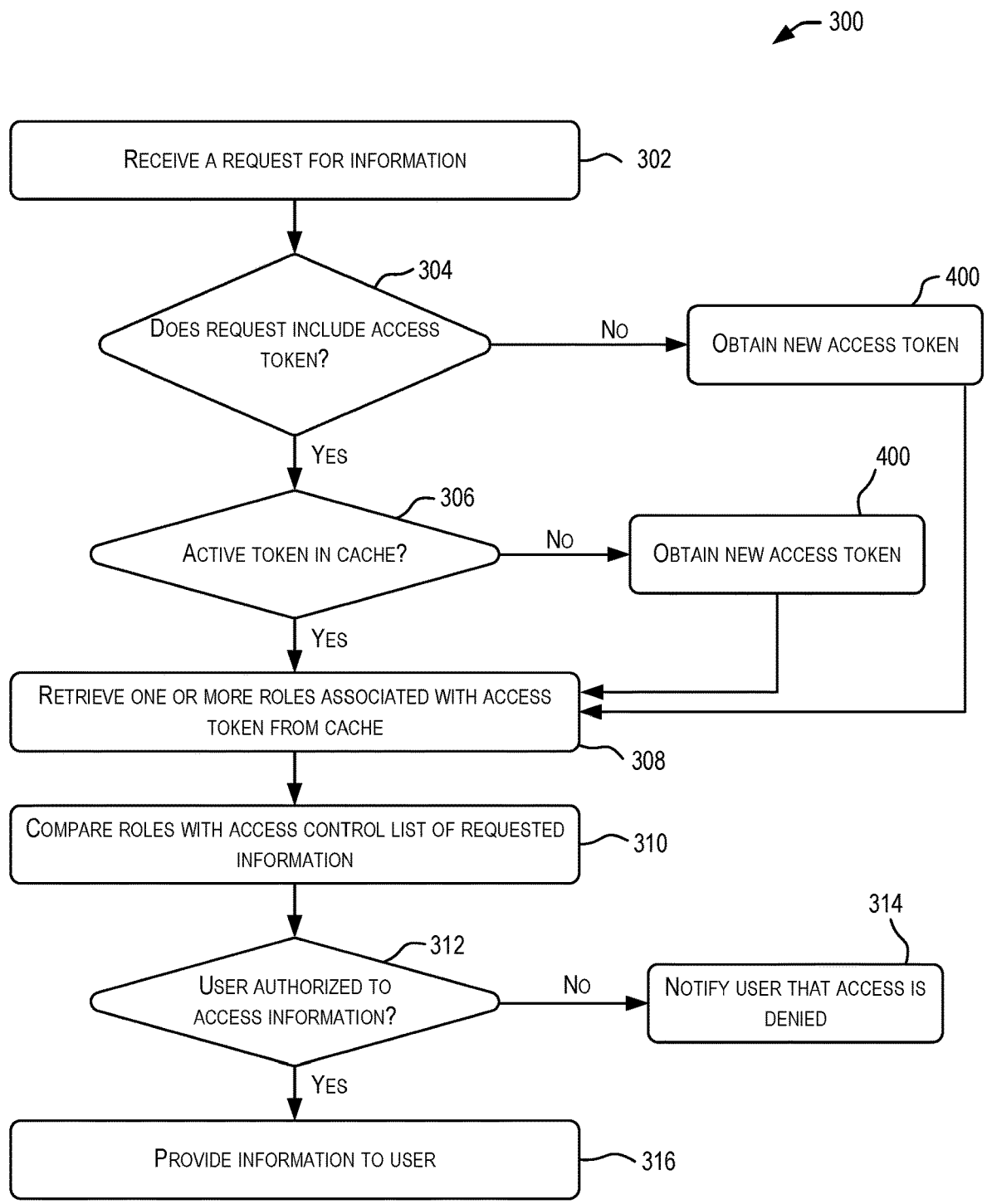
FIG. 3 illustrates an example flow diagram showing process 300 for managing the access of information in a data storage system, in accordance with one embodiment of the present invention.
Figure 4:
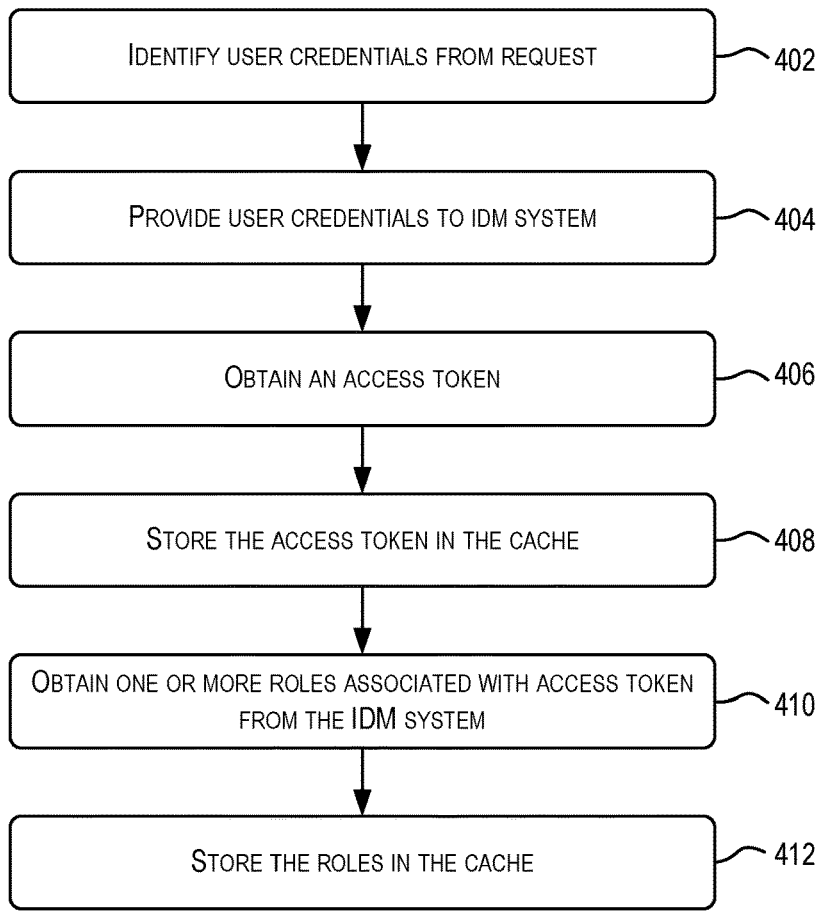
FIG. 4 illustrates an example flow diagram showing process 400 for obtaining an access token for a user of a data storage system, in accordance with one embodiment of the present invention.
Figure 5:
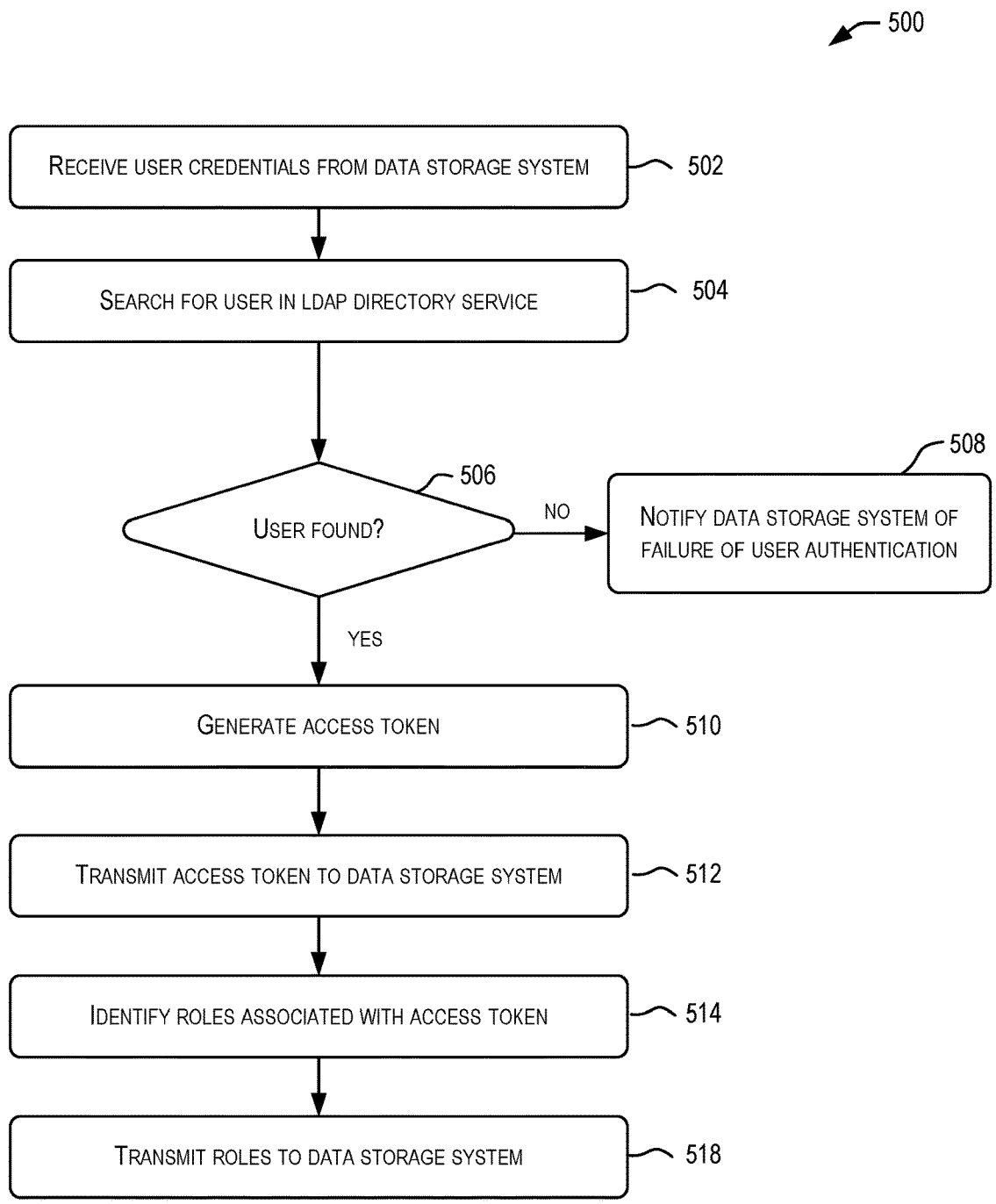
FIG. 5 illustrates an example flow diagram showing process 500 for generating an access token for a user of a data storage system, in accordance with another embodiment of the present invention.

FIGS. 3-5 illustrate example flow diagrams showing processes 300, 400 and 400 for managing the access of information stored in a data storage system. The processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 3 illustrates an example flow diagram showing process 300 for managing the access of information stored in a data storage system, in accordance with one embodiment of the present invention. In some aspects, the process 300 of FIG. 3 may be performed by one or more proxy nodes of data storage system 104, 208 shown in FIG. 1 and FIG. 2 respectively. The process 300 may begin by receiving a request for information stored in the data storage system by a requester (e.g., a user) at 302. As noted above, the user may utilize a computing device (e.g., client device 102, 202) to request for information (e.g., a file, an image, a video and the like) via a user interface (e.g., request UI 202) on the user's computing device. At 304, the process 300 may include determining if the request includes an access token. If the request does not include an access token, then, in some embodiments, process 400 may be performed to obtain a new access token. The manner in which an access token may be obtained is discussed in detail in relation to FIG. 4. If the request includes an access token, then at 306, the process 300 may include determining if a valid access token is stored in the cache (e.g., 118, 216 shown in FIG. 1, FIG. 2 respectively) If the access token stored in the cache is no longer valid (i.e., it has expired), then, in some embodiments, process 400 discussed in FIG. 4 may be performed to obtain a new access token. In some embodiments, upon obtaining a new access token, process 308 may be performed to retrieve one or more roles associated with the access token from the cache at 308.

If the request includes an access token and a valid access token is stored in the cache, then in some embodiments, at 308, the process 300 may include retrieving one or more roles associated with the access token from the cache. At 310, the process 300 may include comparing the roles associated with the access token with an access control list associated with the requested information (object) stored in the data storage system. At 312, the process 300 may include determining if the user is authorized to access the information based on the comparison. If the user is not authorized to access the information, then at 314, the process may include notifying the user that the user has been denied access to the information. If the user is authorized to access the information, then at 316, the process at 300 may include providing the information to the user on client device (e.g., 102, 202).

FIG. 4 illustrates an example flow diagram showing process 400 for obtaining an access token for a user of a data storage system, in accordance with one embodiment of the present invention. In some aspects, the process 400 of FIG. 4 may be performed by one or more proxy nodes of data storage system 104, 208 shown in FIG. 1 and FIG. 2 respectively. The process 400 may begin at 402 by identifying credential information (e.g., a username and a password) in the request received from a user operating client device (e.g., 102, 202). At 404, the process 400 may include providing the user credentials to the IDM system (e.g., 110, 218 shown in FIG. 1, FIG. 2 respectively). At 406, the process 400 may include obtaining an access token from the IDM system. The manner in which an access token may be generated by the IDM system is discussed in detail in FIG. 5. In some embodiments, at 408, the process 400 may include storing the access token in a cache (e.g., 118, 216 shown in FIG. 1, FIG. 2 respectively). In certain embodiments, at 410, the process 400 may include obtaining one or more roles associated with the access token from the IDM system. At 412, the process 400 may include storing the roles in the cache.

FIG. 5 illustrates an example flow diagram showing process 500 for generating an access token for a user of a data storage system, in accordance with an embodiment of the present invention. In some aspects, the process 500 of FIG. 5 may be performed by IDM system 110, 218 shown in FIG. 1 and FIG. 2 respectively. In some examples, the process 500 may begin at 502 by receiving user credentials from the data storage system (e.g., 104, 208 shown in FIG. 1 and FIG. 2 respectively). At 504, the process 500 may include searching for the user in an LDAP directory service (e.g., 220) as described in FIG. 2. At 506, the process 500 may include determining if the user exists in the LDAP directory. If the user does not exist, then the process 500 may include notifying the data storage system of the failure of the user's authentication with the data storage system at 508. If the user exists in the LDAP directory and has been authenticated with the data storage system, then at 510, the process 500 may include generating an access token for the user. At 512, the process 500 may include transmitting the access token to the data storage system. In some examples, at 514, the process 500 may include identifying the set of roles associated with the access token from an access control policy database (e.g., 224). At 518, the process 500 may include transmitting the roles to the data storage system.

Figure 6:
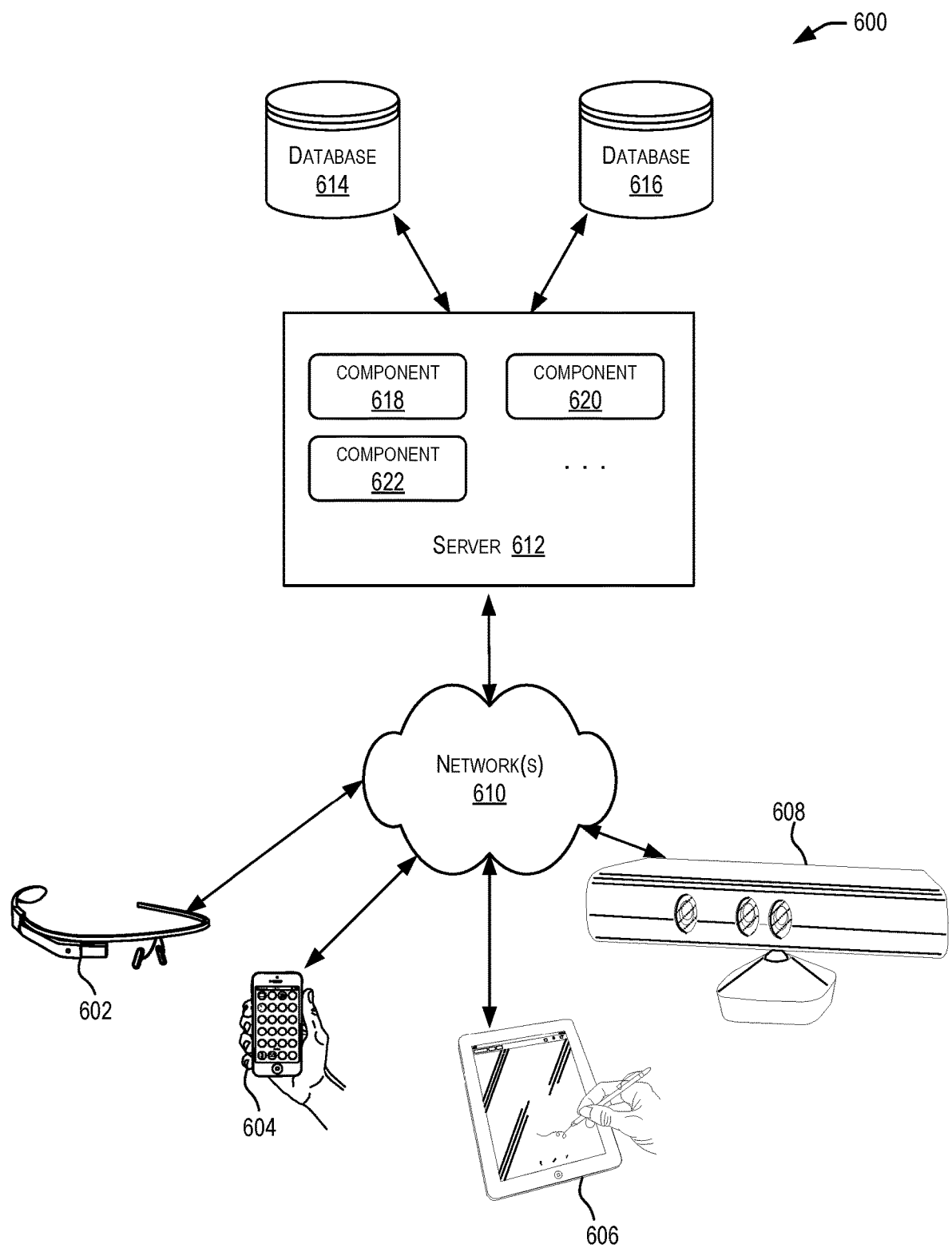
FIG. 6 depicts a simplified diagram of a distributed system 600 for implementing an embodiment of the present invention.

FIG. 6 depicts a simplified diagram of a distributed system 600 for implementing an embodiment of the present disclosure. In the illustrated embodiment, the distributed system 600 includes one or more client computing devices 602, 604, 606, and 608, which are configured to execute and operate a client application such as a web browser, proprietary client (e.g., Oracle Forms), or the like over one or more network(s) 610. The server 612 may be communicatively coupled with the remote client computing devices 602, 604, 606, and 608 via network 610.

In various embodiments, the server 612 may be adapted to run one or more services or software applications such as services and applications that provide storage management services and identity management services. In certain embodiments, the server 612 may also provide other services or software applications can include non-virtual and virtual environments. In some embodiments, these services may be offered as web-based or cloud services or under a Software as a Service (SaaS) model to the users of the client computing devices 602, 604, 606, and/or 608. Users operating the client computing devices 602, 604, 606, and/or 608 may in turn utilize one or more client applications to interact with the server 612 to utilize the services provided by these components.

In the configuration depicted in FIG. 6, the software components 618, 620 and 622 of system 600 are shown as being implemented on the server 612. In other embodiments, one or more of the components of the system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 10 is thus one example of a distributed system for implementing an embodiment system and is not intended to be limiting.

The client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 610.

Although distributed system 600 in FIG. 6 is shown with four client computing devices, any number of client computing devices may be supported. Other devices, such as devices with sensors, etc., may interact with the server 612.

The network(s) 610 in the distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 612 can include one or more virtual machines running virtual operating systems, or other computing architectures involving virtualization. One or more flexible pools of logical storage devices can be virtualized to maintain virtual storage devices for the server. Virtual networks can be controlled by the server 612 using software defined networking. In various embodiments, the server 612 may be adapted to run one or more services or software applications described in the foregoing disclosure. For example, the server 612 may correspond to a server for performing processing as described above according to an embodiment of the present disclosure.

The server 612 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 612 may include one or more applications to analyze and consolidate data feeds and/or event updates received from users of the client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. The server 612 may also include one or more applications to display the data feeds and/or real-time events via one or more display devices of the client computing devices 602, 604, 606, and 608.

The distributed system 600 may also include one or more databases 614 and 616. These databases may provide a mechanism for storing information such as user identity information, and other information used by embodiments of the present invention. Databases 614 and 616 may reside in a variety of locations. By way of example, one or more of databases 614 and 616 may reside on a non-transitory storage medium local to (and/or resident in) the server 612. Alternatively, the databases 614 and 616 may be remote from the server 612 and in communication with the server 612 via a network-based or dedicated connection. In one set of embodiments, the databases 614 and 616 may reside in a storage-area network (SAN). Similarly, any necessary files for performing the functions attributed to the server 612 may be stored locally on the server 612 and/or remotely, as appropriate. In one set of embodiments, the databases 614 and 616 may include relational databases, such as databases provided by Oracle, that are adapted to store, update, and retrieve data in response to SQL-formatted commands.

Figure 7:
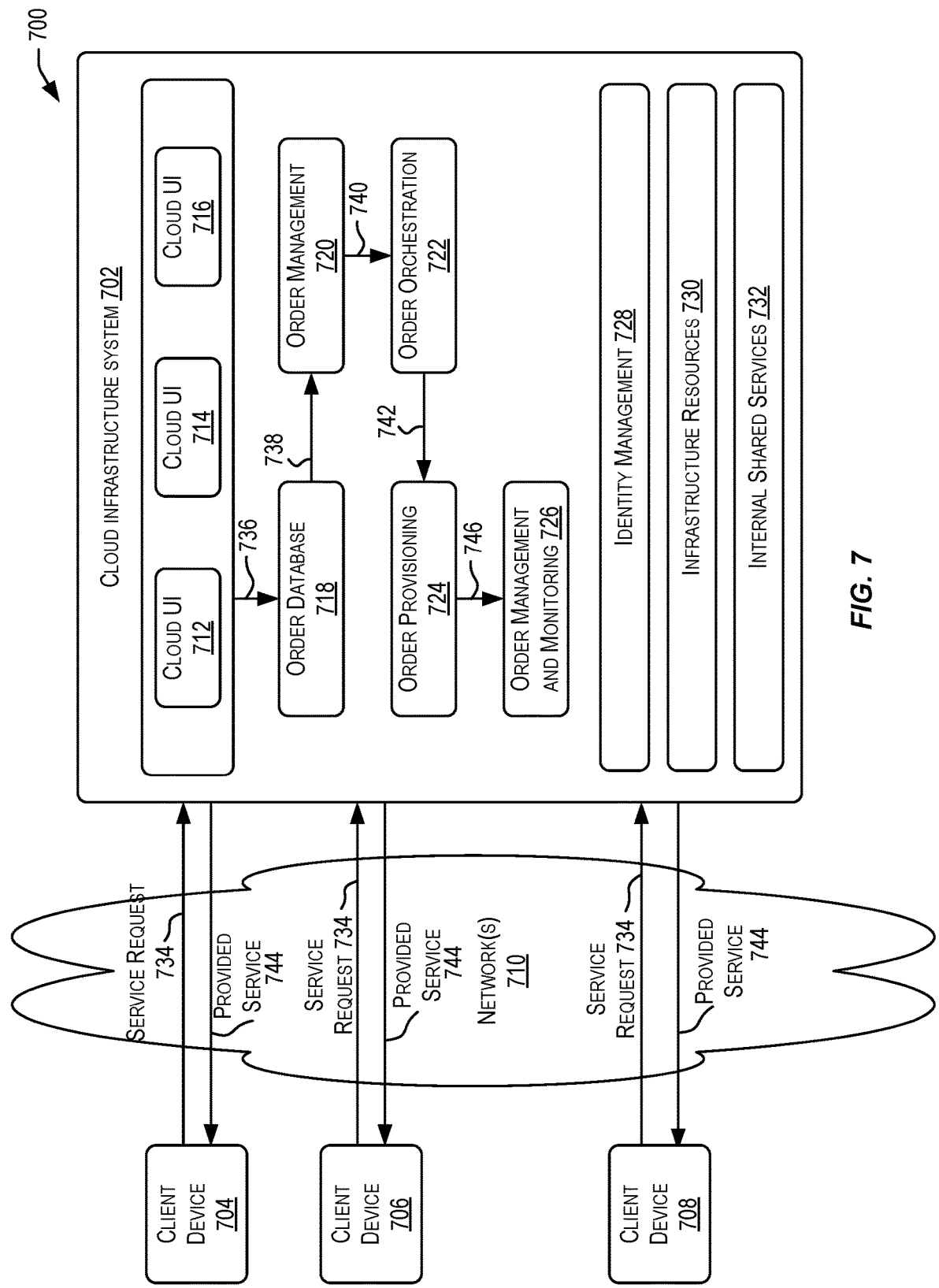
FIG. 7 is a simplified block diagram of one or more components of a system environment 700 in which services may be offered as cloud services, in accordance with an embodiment of the present invention.

In some embodiments, the storage services and identity management services described above may be offered as services via a cloud environment. FIG. 7 is a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for managing the storage of data stored in a data storage system of an organization. Cloud infrastructure system 702 may comprise one or more computers and/or servers that may include those described above for server 612.

It should be appreciated that cloud infrastructure system 702 depicted in FIG. 7 may have other components than those depicted. Further, the embodiment shown in FIG. 7 is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle® Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to identity management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" related computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 724 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
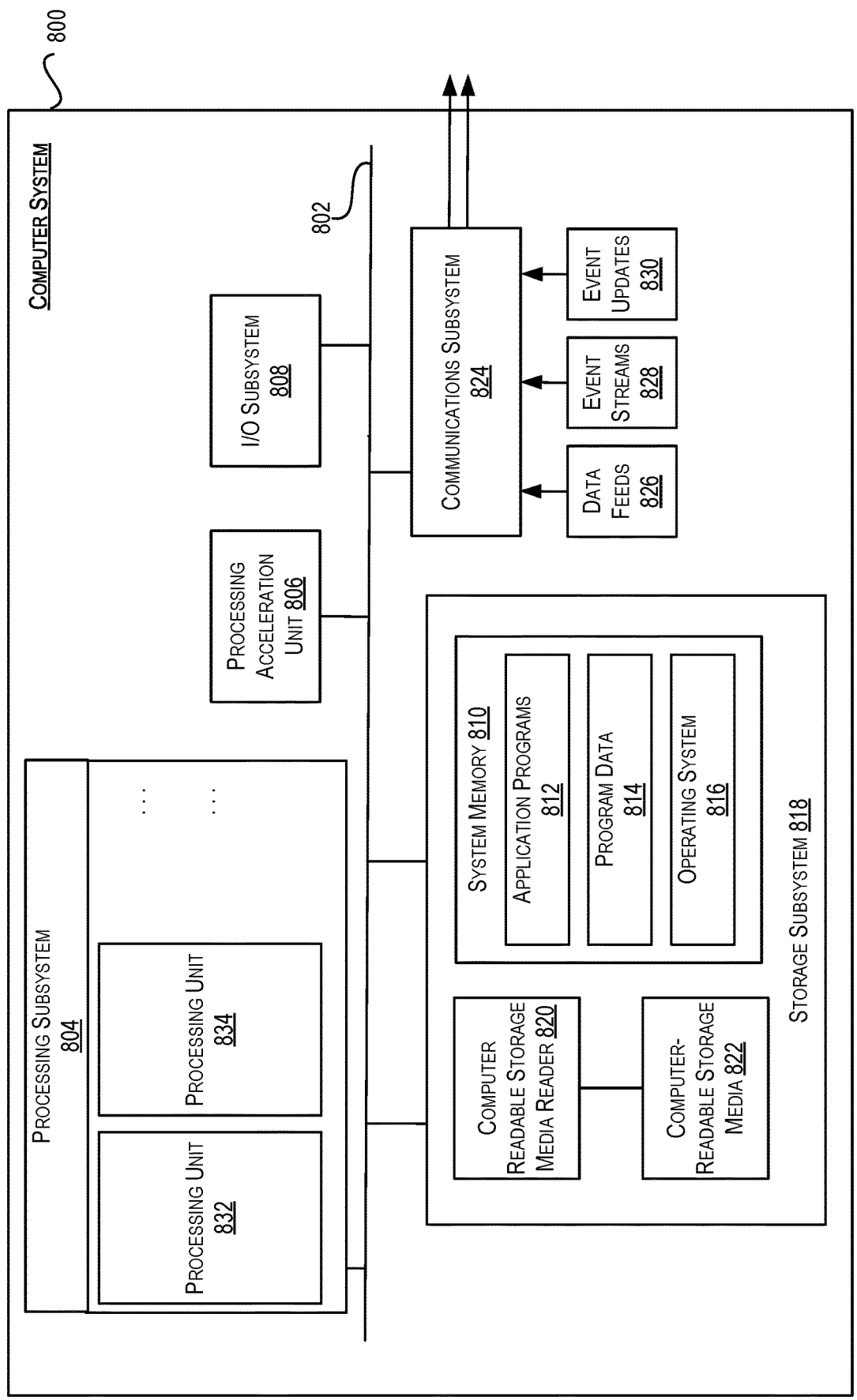
FIG. 8 illustrates an exemplary computer system 800 that may be used to implement an embodiment of the present invention.

FIG. 8 illustrates an exemplary computer system 800 that may be used to implement an embodiment of the present invention. In some embodiments, computer system 800 may be used to implement any of the various servers and computer systems described above. As shown in FIG. 8, computer system 800 includes various subsystems including a processing subsystem 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include be one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 810 including potentially on one or more storage devices. Through suitable programming, processing subsystem 804 can provide various functionalities described above for dynamically modifying documents (e.g., webpages) responsive to usage patterns.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with the present invention.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices. For example, the account management system 112 depicted in FIG. 1 may receive user login information including input related to a training word from client devices using communication subsystem 824.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-implemented method comprising:
storing, in a cache of a data storage system, a set of one or more access tokens generated by an identity management (IDM) system, and a plurality of roles associated with the set of one or more access tokens, wherein the plurality of roles is received by the data storage system from the IDM system;
after the storing, receiving, by the data storage system and from a client device, a request by a requester to access first information managed by the data storage system, the request including an access token; and
without communicating with the IDM system:
determining, by the data storage system, that the set of one or more access tokens stored in the cache of the data storage system includes a particular access token corresponding to the access token received in the request, the particular access token being generated by the IDM system for the requester prior to the data storage system receiving the request;
determining, by the data storage system, from the plurality of roles stored in the cache, a particular set of multiple roles associated with the particular access token;
comparing, by the data storage system, the particular set of multiple roles associated with the particular access token with an access control list associated with the first information;
based upon the comparing, determining that the requester is authorized to access the first information; and
based on determining that the requester is authorized to access the first information, sending, by the data storage system, the first information to the client device.

2. The computer-implemented method of claim 1, wherein the request is a first request; and
wherein the method further comprises, prior to receiving the first request from the requester:
receiving, by the data storage system and from the requester, a second request to access second information managed by the data storage system, the second request including user credential information of the requester;
retrieving, by the data storage system and from the second request, the user credential information;
providing, by the data storage system, user credential information of the requester to the IDM system;
receiving, by the data storage system from the IDM system, the particular access token from the IDM system;

determining, based on receiving the particular access token from the IDM system, that the requester is authenticated by the IDM system based on the user credential information; and
based on determining that the requester is authenticated by the IDM system, storing, by the data storage system, the particular access token in the cache.

3. The computer-implemented method of claim 2, wherein the second information is different from the first information.

4. The computer-implemented method of claim 2, wherein the particular access token further includes expiry time information indicating that the particular access token has not expired.

5. The computer-implemented method of claim 2, wherein the particular access token is encrypted with an encryption key by the IDM, the encryption key being part of an encryption key pair comprising the encryption key and a decryption key; and
wherein the method further comprises:
receiving, by the data storage system and from the IDM system, a digital signature for verifying the access token included in the first request;
extracting, by the data storage system and from the particular access token, an encrypted digital signature and the decryption key;
decrypting, by the data storage system, the encrypted digital signature; and
based on the decrypted digital signature matching the digital signature received from the IDM system, determining, by the data storage system, that the requester is authenticated by the IDM system.

6. The computer-implemented method of claim 2, wherein the access token in the first request is the particular access token received by the requester from the data storage system prior to transmitting the first request.

7. The computer-implemented method of claim 2, further comprising determining whether the second request includes any access token,
wherein the user credential information of the requester is provided to the IDM system based on determining that the second request does not include any access token.

8. The computer-implemented method of claim 1, wherein the particular set of multiple roles is determined by the IDM system based on information from an access control policy database; and
wherein the method further comprises receiving, by the data storage system and from the IDM system, the particular set of multiple roles associated with the particular access token; and
wherein the particular set of multiple roles is stored in the cache as part of the plurality of roles.

9. The computer-implemented method of claim 1, wherein the data storage system comprises a proxy server and a plurality of storage nodes; and
wherein the method further comprises:
identifying, by the proxy server, a first storage node from the plurality of storage nodes based on determining that the first storage node stores the first information; and
retrieving, by the proxy server and from the first storage node, the access control list associated with the first information, the access control list indicating at least one role permitted to access the first information.

10. The computer-implemented method of claim 9, wherein the access control list indicates a scope of access of the first information for the particular set of multiple roles; and wherein the method further comprises:
providing, by the proxy server to the requester via the client device, access to the first information based on the scope of access.

11. A system comprising:
a memory configured to store computer-executable instructions; and
at least one processor configured to access the memory and execute the computer-executable instructions to perform operations to:
store, in a cache of a data storage system, a set of one or more access tokens generated by an identity management (IDM) system, and a plurality of roles associated with the set of one or more access tokens, wherein the plurality of roles is received by the data storage system from the IDM system;
after the storing, receive, from a client device, a request by a requester to access first information managed by the data storage system, the request including an access token;
without communicating with the IDM system:
determine that the set of one or more tokens stored in the cache of the data storage system includes a particular access token corresponding to the access token received in the request, the particular access token generated by the IDM system for the requester prior to the data storage system receiving the request;
determine, from the plurality of roles stored in the cache, a particular set of multiple roles associated with the particular access token; comparing, by the data storage system, the particular set of multiple roles associated with the particular access token with an access control list associated with the first information;
based upon the comparing, determine that the requester is authorized to access the first information; and
based on determining that the requester is authorized to access the first information, send the first information to the client device.

12. The system of claim 11, wherein the request is a first request; and
wherein the at least one processor is configured to access the memory and execute the computer-executable instructions to perform operations to, prior to receiving the first request from the requester;
receive, from the requester, a second request to access second information managed by the data storage system, the second request including user credential information of the requester;
retrieve, from the second request, the user credential information;
provide user credential information of the requester to the IDM system;
receive, from the IDM system, the particular access token from the IDM system;
determine, based on receiving the particular access token from the IDM system, that the requester is authenticated by the IDM system based on the user credential information; and
based on determining that the requester is authenticated by the IDM system, store the particular access token in the cache.

13. The system of claim 12, wherein the second information is different from the first information.

14. The system of claim 12, wherein the access token in the first request is the particular access token received by the requester from the data storage system prior to the requester transmitting the first request.

15. The system of claim 12, wherein the at least one processor is configured to access the memory and execute the computer-executable instructions to perform operations to determine whether the second request includes the particular access token; and
wherein the user credential information of the requester is provided to the IDM system based on determining that the second request does not include the particular access token.

16. The system of claim 11, wherein the particular set of multiple roles is determined by the IDM system based on information from an access control policy database; and
wherein the at least one processor is configured to access the memory and execute the computer-executable instructions to perform operations to:
receive, from the IDM system, the particular set of multiple roles associated with the particular access token; and
store, in the cache, the particular set of multiple roles and an indication that the particular set of multiple roles is associated with the particular access token.

17. One or more non-transitory computer-readable media storing computer-executable instructions executable by one or more processors of a system, the computer-executable instructions comprising instructions that cause the one or more processors to:
store, in a cache of a data storage system, a set of one or more access tokens generated by an identity management (IDM) system, and a plurality of roles associated with the set of one or more access tokens, wherein the plurality of roles is received by the data storage system from the IDM system;
after the storing, receive, from a client device, a request by a requester to access first information managed by the data storage system, the request including an access token;
without communicating with the IDM system:
determine that the set of one or more tokens stored in the cache of the data storage system includes a particular access token corresponding to the access token received in the request, the particular access token being generated by the IDM system for the requester prior to the data storage system receiving the request;
determine, from the plurality of roles stored in the cache, a particular set of multiple roles associated with the particular access token;
compare the particular set of multiple roles associated with the particular access token with an access control list associated with the first information;
based upon the comparing, determine that the requester is authorized to access the first information; and
based on determining that the requester is authorized to access the first information, send the first information to the client device.

18. The one or more non-transitory computer-readable media of claim 17,
wherein the request is a first request; and
wherein the computer-executable instructions comprise instructions that cause the one or more processors to, prior to receiving the first request from the requester:

receive, from the requester, a second request to access second information managed by the data storage system, the second request including user credential information of the requester;

retrieve, from the second request, the user credential information;

provide user credential information of the requester to the IDM system;

receive, from the IDM system, the particular access token from the IDM system;

determine, based on receiving the particular access token from the IDM system, that the requester is authenticated by the IDM system based on the user credential information; and based on determining that the requester is authenticated by the IDM system, store the particular access token in the cache.

19. The one or more non-transitory computer-readable media of claim 17, wherein the one or more processors are coupled with a plurality of storage nodes; and wherein the computer-executable instructions comprise instructions that cause the one or more processors to:

identify a first storage node from the plurality of storage nodes based on determining that the first storage node stores the first information; and retrieve, from the first storage node, the access control list.

20. The one or more non-transitory computer-readable media of claim 19, wherein the access control list indicates a scope of access of the first information for the particular set of multiple roles; and wherein the computer-executable instructions comprise instructions that cause the one or more processors to provide, to the requester via the client device, access to the first information based on the scope of access.

* * * * *

UNITED STATES PATENT AND TRADEMARK OFFICE
CERTIFICATE OF CORRECTION

PATENT NO. : 10,805,383 B2
APPLICATION NO. : 16/292669
DATED : October 13, 2020
INVENTOR(S) : Schincariol et al.

Page 1 of 1

It is certified that error appears in the above-identified patent and that said Letters Patent is hereby corrected as shown below:

In the Specification

In Column 1, Line 15, after "purposes" insert -- . --.

In Column 8, Line 23, after "token" insert -- . --.

In the Claims

In Column 25, Line 50, in Claim 12, delete "requester;" and insert -- requester: --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*